United States Patent [19]
Gupta et al.

[11] Patent Number: 5,175,647
[45] Date of Patent: Dec. 29, 1992

[54] OPTICAL DEVICE

[75] Inventors: Mool C. Gupta, Webster; Song-Tsuen Peng, Dix Hills, both of N.Y.

[73] Assignee: Eastman Kodak Company, Rochester, N.Y.

[21] Appl. No.: 721,021

[22] Filed: Jun. 26, 1991

[51] Int. Cl.⁵ .............................................. G02B 5/18
[52] U.S. Cl. .................................... 359/566; 359/575
[58] Field of Search ................. 359/566, 569, 572, 575

[56]  References Cited
U.S. PATENT DOCUMENTS

| | | | |
|---|---|---|---|
| 4,360,251 | 11/1982 | Rajchman | 359/569 |
| 4,672,187 | 6/1987 | Fujita et al. | 250/201 |
| 4,765,705 | 8/1988 | Seymour et al. | 359/566 |
| 4,828,356 | 5/1989 | Hobrock et al. | 359/572 |
| 4,933,640 | 6/1990 | Swanson et al. | 359/569 |

OTHER PUBLICATIONS

"A High Density Dual Type Grating for Magneto-Optical Disk Head", Journal of Applied Physics, vol. 28, Supplement 28-3, pp. 193-195, 1989.

"Rigorous Analysis of Guided Waves in Doubly Periodic Structures", Journal Optical Society of America, A7, 1448 (1990).

Primary Examiner—Constantine Hannaher
Assistant Examiner—Don Wong
Attorney, Agent, or Firm—William W. Holloway

[57]  ABSTRACT

An optical device is disclosed for diffracting an incident beam of radiation to form a plurality of discrete diffracted beams of different orders. The optical device comprises two diffraction gratings which are supported on a substrate and are separated from each other by a thin film. In order to obtain the advantages of a doubly-periodic structure, the thickness of the thin film between the two gratings is very accurately controlled to be on the order of the wavelength of the incident beam of radiation.

9 Claims, 2 Drawing Sheets

OPTICAL DEVICE

FIELD OF THE INVENTION

The present invention relates to an optical device for diffracting an incident beam of radiation, and more particularly, to a device for diffracting an incident beam of radiation to form a plurality of discrete beams of different orders.

STATE OF THE PRIOR ART

The diffraction of light by two gratings separated by a large distance (relative to the wavelength) is known in the art, and such a device has been used to achieve wavelength stability in an application such as an optical pickup-head. For example, in a paper entitled "A High Density Dual Type Grating for Magneto-Optical Disk Head," Journal of Applied Physics, Vol. 28, Supplement 28-3, pp. 193-195 (1989), there is disclosed an optical pickup head in which a reflected beam from an information recording surface is directed to a first diffraction grating on one side of a substrate. The beam passes through the substrate and is directed to a photodetector by means of a second diffraction grating located on an opposite side of the substrate.

One problem with the device shown in the above paper is that it is not suitable for applications where it is desired to have the incident beam normal to the device. Only a single output beam can be obtained at normal incidence, and if the periods of the two gratings are equal, no diffracted beam is produced at normal incidence. However, in order to compensate for beam position shifts due to wavelength change in such a device, the periods of the two gratings have to be equal. Thus, the device cannot be used at normal incidence in applications where it is important to compensate for beam position shifts due to wavelength change.

SUMMARY OF THE INVENTION

It is an object of the present invention to provide an optical device which overcomes the problems in the prior art discussed above.

In accordance with one aspect of the present invention, there is provided an optical device for diffracting an incident beam of radiation to form a plurality of discrete diffracted beams of different orders, the optical device comprising: a first diffraction grating formed in a substrate; and a second diffraction grating formed in a surface of the device, the first and second gratings being uniformly spaced apart by a distance approximating the wavelength of the incident beam of radiation.

In one embodiment of the present invention, the optical device comprises a quartz substrate which has a first diffraction grating formed on a surface of the substrate. A glass coating is formed on top of the first diffraction grating, and a second diffraction grating of a period different from the period of the first grating is formed in the glass film. The thickness of the glass film between the two gratings is accurately controlled to be on the order of the wavelength of the light which will be used with the device. The thickness can be any value between 0.1 microns and 10 microns. The structure formed is known as a doubly periodic structure (DPS).

A principal advantage of the optical device of the present invention is that a light beam diffracted by the device is insensitive to changes in the wavelength of the incident light. A further advantage is that higher order beams are excited by the interaction of the two grating through the evanescent field. Finally, the doubly periodic structure enhances the light-coupling efficiency of the optical device, and it can broaden the acceptance wavelength of light coupling by a grating.

Other features and advantages will become apparent with reference to the following description of the preferred embodiment when read in light of the attached drawings.

DESCRIPTION OF THE PREFERRED EMBODIMENT

Figure 1:
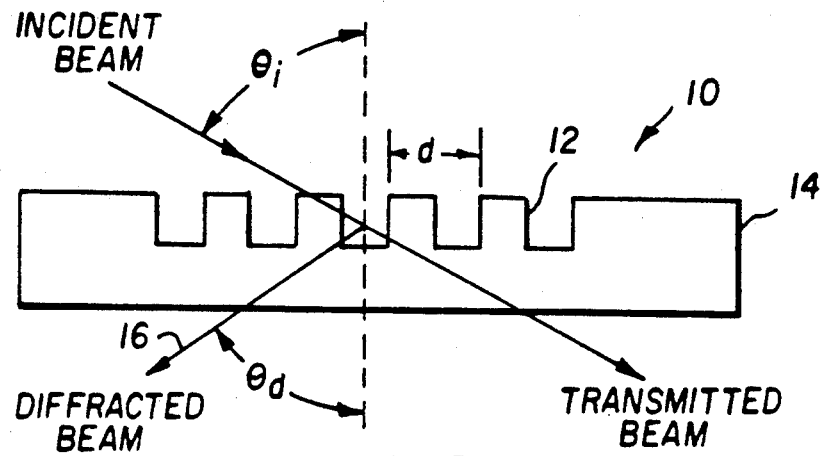
FIG. 1 is an elevational view of a prior-art device which includes a single grating.

In FIG. 1, there is shown a prior-art device 10 in which a diffraction grating 12 is formed on a substrate 14. A diffraction angle of an optical beam 16 from a periodic structure, as shown in FIG. 1, can be described by a grating equation:

$$\sin\Theta_d = \sin\Theta_i - \frac{\lambda}{m_d} \quad (1)$$

where $\Theta_d$ is the diffraction angle, $\Theta_i$ is the incidence angle, $\lambda$ is wavelength of light, d is the grating period, and m is an integer.

Figure 2:
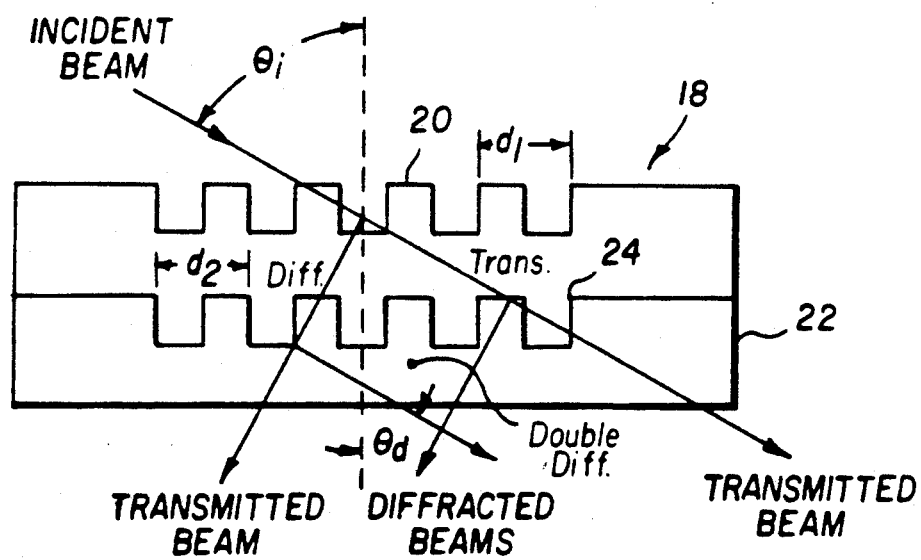
FIG. 2 is a an elevational view of prior-art device in which two gratings are separated by a relatively large distance.

In FIG. 2., there is shown another prior-art device 18 in which a first diffraction grating 20 is formed on one surface of a substrate 22, and a second diffraction grating 24 is formed in the substrate 22. The distance between gratings 20 and 24 is at least 1000 microns. A diffraction angle from a double grating, as shown in FIG. 2, can be described by the equation:

$$\sin\Theta_d = \sin\Theta_i - \frac{m\lambda}{d_2} - \frac{m\lambda}{d_1} \quad (2)$$

Figure 3:
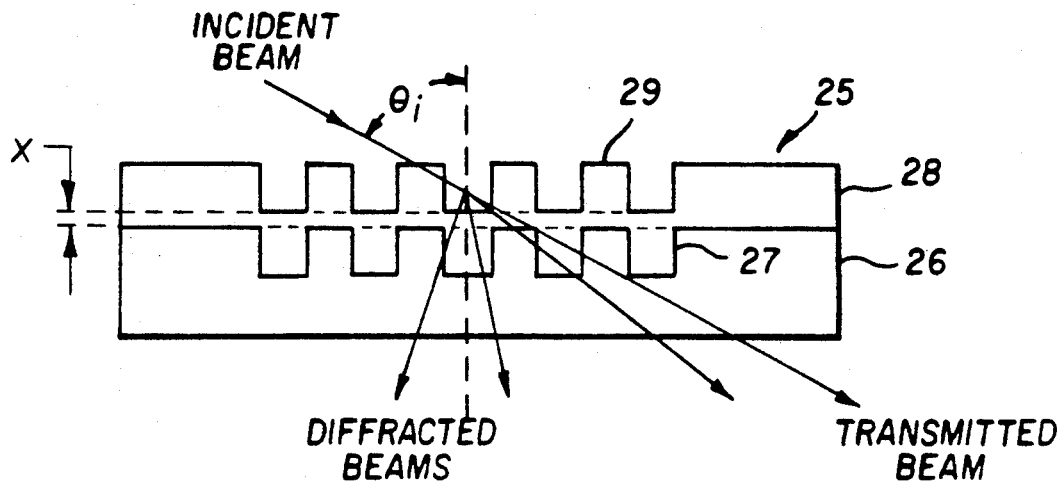
FIG. 3 is an elevational view of the optical device of the present invention.

An optical device 25, constructed in accordance with the present invention, is shown in FIG. 3. Optical device 25 comprises a substrate 26, a first grating 27 formed in substrate 26, a thin film 28 formed over grating 27, and a second grating 29 formed in thin film 28. The distance X between gratings 27 and 29 is generally equal to the wavelength of the light to be used with device 25, and can be between 0.1-microns and 10 microns. A diffraction angle from a doubly periodic structure, as shown in FIG. 3, can be described by an equation obtained from theoretical calculations as:

$$\sin\Theta_{mn} = \sin\Theta_i + \frac{\lambda}{m d_2} + \frac{\lambda}{n d_1} \quad (3)$$

where m and n may take a positive or negative integer. Here $\Theta_{m,n}$ is the angle of m,nth diffracted order, $\Theta_i$ is the angle of incidence, $\lambda$ is the incident wavelength, and d1 and d2 are the periods of the two gratings. The theoretical results calculated from Equation (3) are listed in Table 1, together with measured values; it will be seen that the two sets of data agree with each other quite well. In the calculations for Table 1: $\Theta_i = 0$ — Normal incidence; $d_1 = 0.36$ μm, $d_2 = 0.45$ μm, $\lambda = 0.6328$ μm; and $\sin \Theta_{mn} = m\ 1.7578 + n\ 1.4062$.

TABLE 1

Measured and Calculated Diffraction Angles From a Doubly-Periodic Structure

| m | n | Calc. $\Theta_{m,n}$ | Meas. $\Theta_{m,n}$ |
|---|---|---|---|
| 0 | 0 | 0 | Trans |
| −1 | −1 | −20.58 | −21.8 |
| −1 | −1 | −20.58 | −21.5 |
| −2 | −2 | −44.7 | −45.9 |
| −2 | −2 | −44.7 | −45.9 |

The appearance of various diffracted orders from device 25 may be explained as follows. Though invisible, the electromagnetic fields of the higher-order space harmonics, which are diffracted individually by each grating, are evanescent. Because of the small separation between the two gratings, the evanescent fields diffracted from one grating may interact with the other, resulting in many higher-harmonics radiation modes that propagate out of the structure; therefore, higher-order beams appear. If the separation is large, the evanescent fields from one grating will be too weak to interact with the other grating. More specifically, although the higher-order beams may still be in existence, their intensities are too low to be observable. Thus, the interaction of the two gratings of different periods through the evanescent fields results in the otherwise unexpected diffracted beams.

Some of the unique diffraction characteristics observed from the evanescently-coupled doubly-periodic structure of device 25 are: (1)- diffraction orders that are not allowed by individual gratings are allowed by DPS; (2) diffraction angles of various orders are relatively insensitive to the wavelength change, particularly if the two grating periods are nearly identical; and (3) many higher-order diffracted beams can be produced with significant intensities.

In the fabrication of optical device 25, a grating was prepared on a quartz substrate by coating the substrate with a photoresist and holographically exposing it with a He-Cd laser beam. The photoresist can be, for example, Shipley 1400-17 resist, available from Shipley Corporation. The photoresist was developed using Shipley 351 developer in a 50% solution at about 20 degrees C. After development, the photoresist was etched using an ion beam to transfer the pattern into the quartz substrate. The residual photoresist was then removed using an acetone solution, leaving the first grating. A Corning 7059 glass film was then coated on top of the first grating using a sputtering method. The thickness of the glass film between the two gratings was accurately controlled to a selected value between 0.1 μm and 10 μm. A second grating of a period different from the period of the first grating was formed on top of the glass film using the same process used to form the first grating. The periods of the first and second gratings can be, for example, 0.36 μm and 0.45 μm, respectively.

Figure 4:
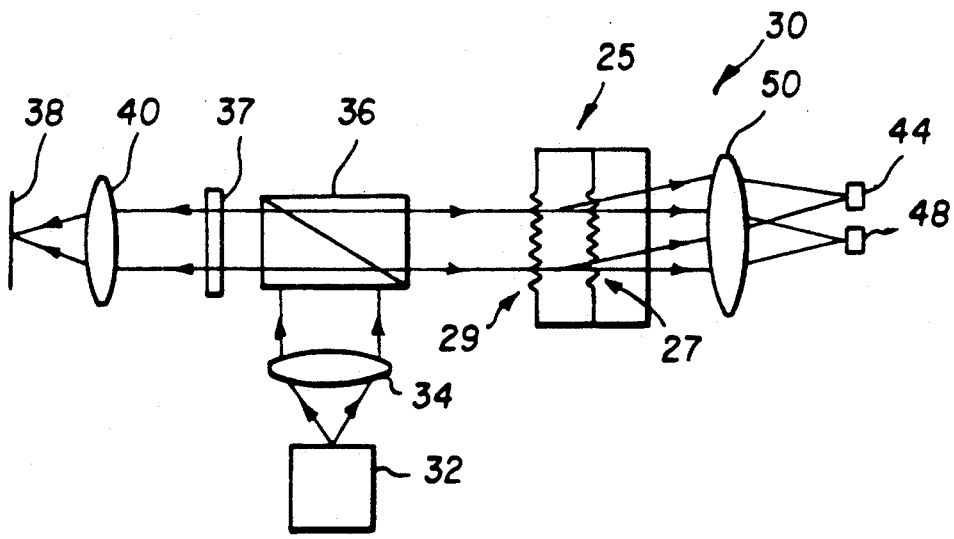
FIG. 4 is a plan view of apparatus of a type which can utilize the optical device of the present invention.

With reference to FIG. 4, there is shown an optical head 30 of a type which can utilize the present invention. Optical head 30 can be used, for example, with an optical disc for tracking purposes. Optical head 30 comprises a light source which can be, for example, a diode laser 32. A beam from diode laser 32 is directed to a collimating lens 34, and the beam from the lens 34 is directed to a polarizing beam splitter 36. The beam from beam splitter 36 passes through a quarter-wave plate 37 and is focused on an optical disc 38 by means of a lens 40. A beam reflected from optical disc 38 passes through quarter-wave plate 37, beam splitter 36 and optical device 25, and the diffracted beams from device 25 are focused on detectors 44 and 48 by means of a lens 50. Signals from detectors 44 and 48 can be processed in a well-known manner for error detection, for tracking, and for signal detection.

The invention has been described in detail with particular reference to the preferred embodiments thereof, but it will be understood that variations and modifications can be effected within the spirit and scope of the invention.

What is claimed is:

1. An optical device for diffracting an incident beam or radiation to form a a plurality of discrete diffracted beams of different orders, said optical device comprising:
   a first diffraction grating formed in a substrate; and
   a second diffraction grating formed in a surface of said device, said first and said second gratings being uniformly spaced apart by a distance approximating the wavelength of said incident beam of radiation, wherein a spacing between said first and said second gratings is between about 0.1 μm and about 10.0 μm.

2. The optical device, as defined by claim 1, wherein said first and said second gratings are substantially identical.

3. The optical device, as defined in claim 1, wherein said substrate is a transparent member having a thickness of about 0.5 millimeters.

4. The optical device, as defined in claim 3, wherein said first grating is formed in a reflective surface of the substrate, said substrate having a thickness of about 0.5 millimeters.

5. The optical device, as defined in claim 3, wherein said second grating is formed in a optically transparent thin film disposed on said first grating.

6. The optical device, as defined in claim 5, wherein said substrate comprises quartz.

7. The optical device, as defined in claim 6, wherein said thin film comprises quartz.

8. The optical device, as defined in claim 7, wherein said first grating has a period of about 0.36 μm.

9. The optical device, as defined by claim 8, wherein said second grating has period of about 0.45 μm.

* * * * *